Feb. 10, 1953 — C. W. MUSSER ET AL — 2,627,998
INFLATOR FOR PNEUMATIC LIFESAVING DEVICES
Filed Jan. 9, 1950 — 5 Sheets-Sheet 1
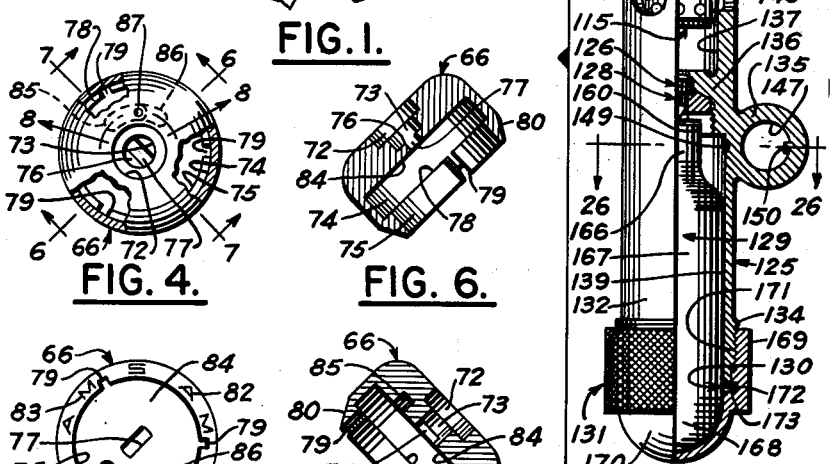
INVENTORS.
C. WALTON MUSSER.
ALBERT BENDITT.
BY
G. J. Kessenich & J. H. Church
ATTORNEYS.

Feb. 10, 1953 C. W. MUSSER ET AL 2,627,998
INFLATOR FOR PNEUMATIC LIFESAVING DEVICES
Filed Jan. 9, 1950 5 Sheets-Sheet 2

INVENTORS.
C. WALTON MUSSER.
ALBERT BENDITT.
BY
G. J. Kessenich, J. H. Church
ATTORNEYS.

Feb. 10, 1953     C. W. MUSSER ET AL     2,627,998
INFLATOR FOR PNEUMATIC LIFESAVING DEVICES

Filed Jan. 9, 1950     5 Sheets—Sheet 3

INVENTORS.
C. WALTON MUSSER.
ALBERT BENDITT.
BY G. J. Kessenich & J. H. Church
ATTORNEYS.

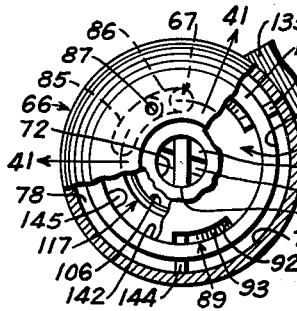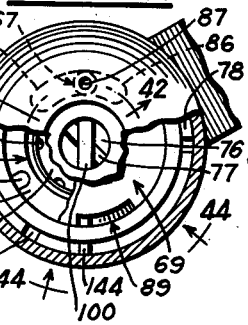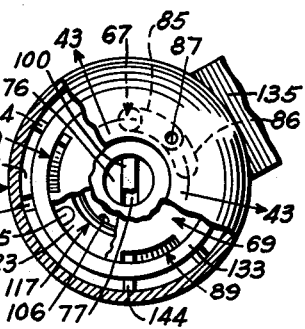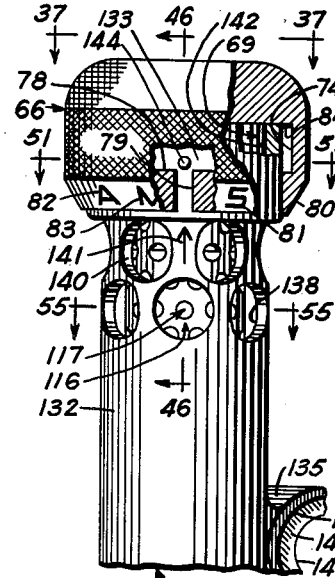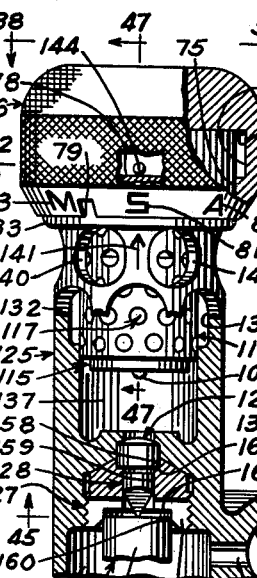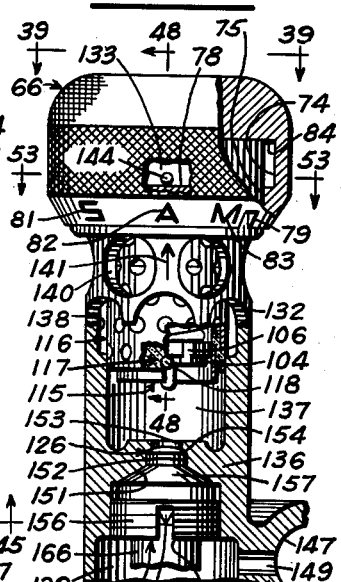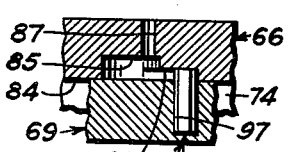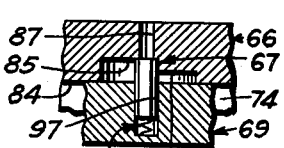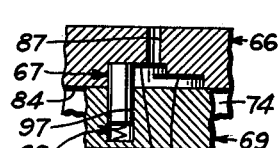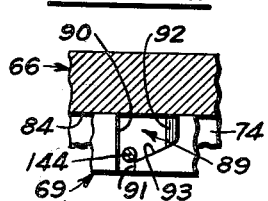

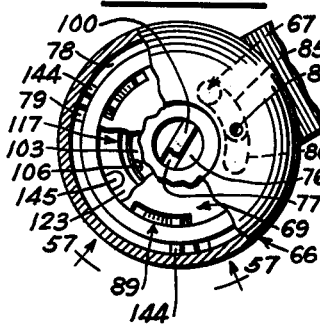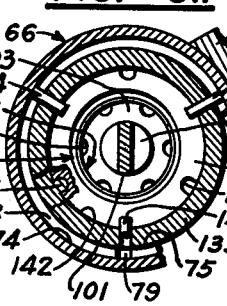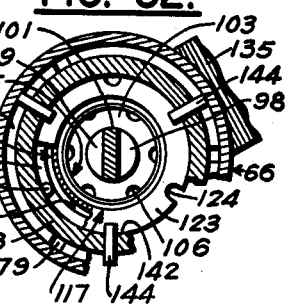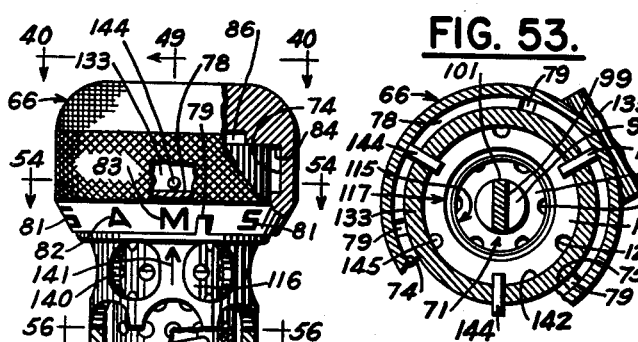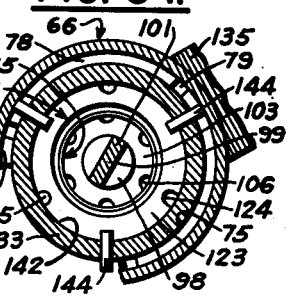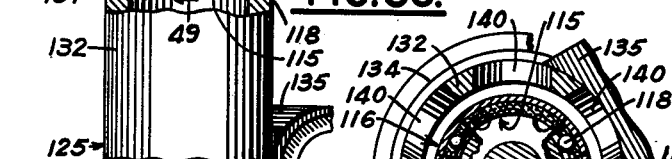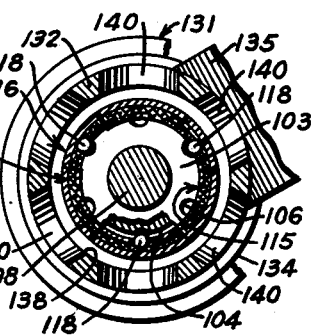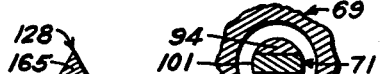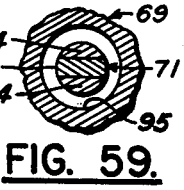

Patented Feb. 10, 1953

2,627,998

UNITED STATES PATENT OFFICE 2,627,998

INFLATOR FOR PNEUMATIC LIFESAVING DEVICES

Clarence Walton Musser, Glenside, and Albert Benditt, Philadelphia, Pa.

Application January 9, 1950, Serial No. 137,522

10 Claims. (Cl. 222—5)

(Granted under Title 35, U. S. Code (1952), sec. 266)

The invention described herein may be manufactured and used by or for the Government for governmental purposes without the payment of any royalty thereon.

In its broad aspects, our invention relates to fluid actuated signals, alarms and indicators and, while not limited solely thereto, has particular reference to collapsible, inflatable, life saving devices such as rubber suits, vests, rafts, boats, and the like carried in all types of aircraft.

The rapid growth of aeromarine and transoceanic flying, as well as the extensive use of land or aircraft carrier-based naval planes, has made it necessary to provide a means of saving the lives of aircraft personnel and passengers from drowning at times when emergency landing on water is necessary or unavoidable, especially if the aircraft is unable to remain afloat.

Since in all aircraft, maximum use must be made of available space and "non-pay" loads must be kept to a minimum, such life saving means usually are deflated, collapsible rubber devices which are inflated for use only when the necessity therefor arises.

One object of our invention is to provide a light, small, compact, simply constructed yet highly effective means for inflating life saving devices of the character previously mentioned.

Another object is to provide a means for inflating life saving devices which is incapable of being accidentally disassembled or operated.

A further object is to provide a means for inflating life saving devices which is operable either manually at will or automatically upon contact with water or other liquid.

Still another object is to provide a means for inflating life saving devices which is insensible to mechanical shock and to changes in barometric pressure.

A still further object is to provide a means for inflating life saving devices which is capable of being set at will in an inoperative or "safe" position until the user desires to make it operative either automatically or manually.

Yet another object is to provide a means for inflating life saving devices which is easily accessible for inspection and/or replacement of parts.

We have accomplished the foregoing and other objects by providing unique, positive acting means whereby a sealed cylinder containing a gas under pressure can be punctured either at will by the user or automatically when the user plunges into water or the like, so that the gas is instantaneously released and then directed into an inflatable life saving device.

Solely for illustrative reasons our novel invention will be here discussed in connection with its application to an inflatable rubber life saving vest, although it must be understood that there are many other equally important usages for our device.

The construction and operation of our invention will become clear from an inspection of the following specification and accompanying drawings wherein:

Fig. 1 shows in outline the torso of an aircraft passenger wearing an inflatable life saving vest bearing our inventive devices which have been exposed to side view in the drawing by lifting up the vest's front flaps;

Fig. 2 is a transverse section taken on line 2—2 of Fig. 1;

Fig. 3 is an exploded side view of our device;

Fig. 4 is a top plan view, partly in section, of one important component (the operating cap) of our invention taken from line 4—4 of Fig. 3;

Fig. 5 is a bottom plan view of the same component, partly in section, taken from line 5—5 of Fig. 3;

Figs. 6, 7 and 8 are longitudinal sections taken along lines 6—6, 7—7, and 8—8 respectively of Fig. 4;

Fig. 9 is a top plan view of a second important component (the drum cam) of our invention taken from line 9—9 of Fig. 3;

Figs. 10 and 11 are longitudinal sections taken along line 10—10 and 11—11 respectively of Fig. 9;

Fig. 12 is a side view taken from line 12—12 of Fig. 9;

Fig. 13 is a top plan view of a third important component (the firing pin) taken from line 13—13 of Fig. 3;

Figs. 14 and 15 are side views taken from lines 14—14 and 15—15 respectively of Fig. 13;

Figs. 16 and 17 are transverse sections taken along lines 16—16 and 17—17 respectively of Fig. 14;

Fig. 18 is a longitudinal section showing the components of Figs. 7, 11, and 15, together with other components, preparatory to combining them into a first sub-assembly by employing an assembling jig.

Figs. 19, 20, and 21 are longitudinal sections similar in part to Fig. 18, except that the components thereof are shown in certain progressive stages of assemblage;

Fig. 22 is a view taken along line 22—22 of Fig.

Figure 27:
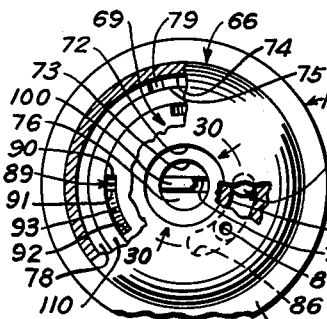
Figure 28:
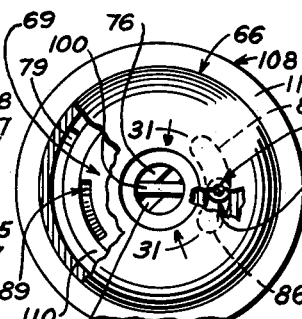
Figure 29:
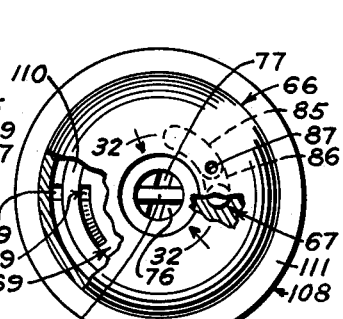
Figure 30:
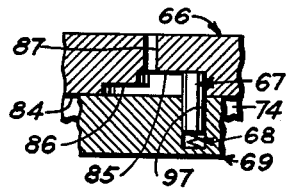
Figure 31:
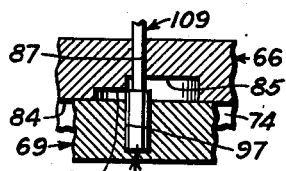
Figure 32:
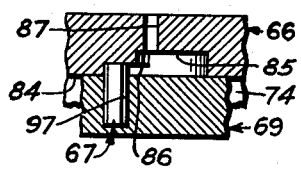
Figure 48:
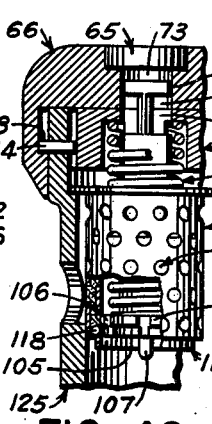
Figure 50:
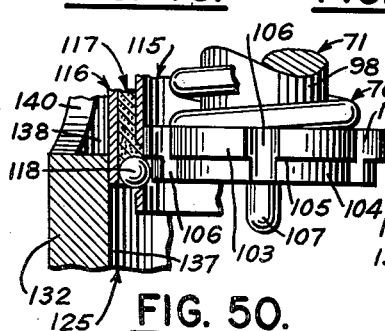
Figure 50A:
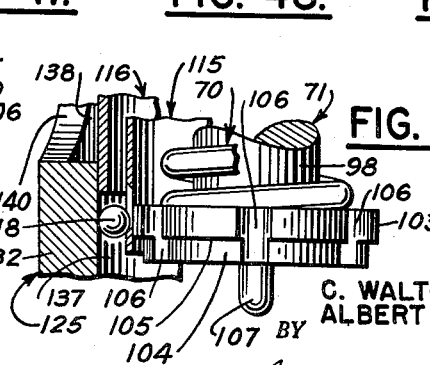

19, but completed to show a portion of a full transverse section;

Fig. 23 is a side view, partly in section, of a second sub-assembly;

Fig. 24 is a side view, partly in section, showing the relative positions of the Fig. 3 components, which have been joined to form certain sub-assemblies, just prior to the complete final assembly thereof;

Fig. 25 is a top view, partly in section, taken from line 25—25 of Fig. 24;

Fig. 26 is a view taken along line 26—26 of Fig. 24, but completed to show a full transverse section;

Figs. 27, 28, and 29 are top views, partly in section, taken from corresponding lines 27—27, 28—28, and 29—29 of Figs. 19, 20 and 21, respectively, but completed to show the full plan;

Figs. 30, 31 and 32 are longitudinal sections taken along corresponding lines 30—30, 31—31, and 32—32 of Figs. 27, 28 and 29, respectively;

Figs. 33, 34, 35, 36 are side views, partly in section, showing the various stages and conditions encountered during the final assembly and operation of our invention;

Fig. 36A is a longitudinal section, similar to Fig. 36, showing a certain phase of operation of our invention;

Figs. 37, 38, 39 and 40 are top views, partly in section, taken from corresponding lines 37—37, 38—38, 39—39 and 40—40, of Figs. 33, 34, 35 and 36, respectively;

Figs. 41, 42 and 43 are similar longitudinal sections taken along corresponding lines 41—41, 42—42 and 43—43 of Figs. 37, 38 and 39, respectively;

Fig. 44 is a side view taken from line 44—44 of Fig. 38, some interfering parts having been removed for purposes of clarity;

Fig. 45 is a view taken along line 45—45 of Fig. 34, but substantially completed to show practically a full transverse section;

Figs. 46, 47, 48 and 49 are longitudinal sections taken along corresponding lines 46—46, 47—47, 48—48, and 49—49 of Figs. 33, 34, 35 and 36, respectively;

Fig. 50 is an enlargement of a portion of Fig. 48 showing a phase of operation of our inventive device;

Fig. 50A is a similar enlargement showing another operative phase of the same part of our apparatus;

Figs. 51, 52, 53 and 54 are transverse sections taken along corresponding lines 51—51, 52—52, 53—53 and 54—54 of Figs. 33, 34, 35, and 36, respectively;

Figs. 55 and 56 are transverse sections taken along corresponding lines 55—55 and 56—56 of Figs. 33 and 36, respectively;

Fig. 57 is a side view taken from line 57—57 of Fig. 40, some interfering parts having been removed for purposes of clarity;

Fig. 58 is a transverse section taken along line 58—58 of Fig. 3; and

Fig. 59 is a view taken along line 59—59 of Fig. 19, but completed to show a portion of a full transverse section.

Because our completely assembled inventive device is composed of two major sub-assemblies as well as other equally important individual components, and because a step by step discussion will facilitate the understanding of the important features of our invention, it would be well to mention the pattern to be followed in disclosing our invention:

Initially we will discuss the components which comprise the first sub-assembly. After that we will introduce an assembly jig and pin tool which can be used effectively in assembling the components of the first sub-assembly. Next, a procedure found to be acceptable in making the first sub-assembly will be discussed. Finally, concerning the first sub-assembly, the important unique features of the sub-assembly will be surveyed.

Following the first sub-assembly, components comprising the second sub-assembly will be introduced. Next, a procedure relating to the assembly of the components of the second sub-assembly will be disclosed. Then we shall point out various salient features of that sub-assembly.

After the second sub-assembly, we shall consider the remaining individual components and, ultimately, the final assembly of all the components and the operation of our inventive device.

At various places throughout the disclosure of our invention such terms as upper, lower, top, bottom, below, etc. will be used to indicate direction. In order not to be misunderstood the words "upper" and "top," used in connection with some side views and some longitudinal sections, will have directional reference to the top of the drawing sheet as it is held in normal position for reading. Coincidentally, the words "upper" and "top" will also refer in actuality to the top of our device when it is in the position shown in Fig. 1.

The terms "below," "lower" and "bottom" also used in connection with some side views and some longitudinal sections will have directional reference to the bottom of the drawing sheet as it is held in normal position for reading. These words, too, will also actually refer to the bottom of our device when it is in the position shown in Fig. 1.

COMPONENTS OF FIRST SUB-ASSEMBLY

Our first sub-assembly consists of a plug 65, an operating cap 66, a detent 67, a detent spring 68, a drum cam 69, a firing pin spring 70, and a firing pin 71 (see Figs. 3 and 18). These parts will be elaborated upon below.

*Plug and operating cap*

Plug 65 is merely a short cylindrical piece of metal or transparent plastic material of a size capable of being force fitted into a recess (later to be described) in the top of operating cap 66.

Referring to Figs. 3 to 8 inclusive, operating cap 66 is a knob-like member having axially located cylindrical recesses 72 and 73 emanating from its upper end surface, and recesses 74 and 75 (Figs. 6-7) emanating from its lower end surface. Recess 72 is of such diameter and depth as to accommodate plug 65 which is later forced into place there. Adjacent recess 72 is the inner, smaller recess 73 at the bottom of which is a floor portion 76 which contains a centrally located slot 77 whose ends are continuous with diametrically opposed wall portions of recess 73. Recess 74 is larger in diameter than recess 75, the two forming at their juncture a shoulder 78. Cut into the wall of recess 75 are three equally spaced grooves 79 whose bottoms coincide with the wall of recess 74 (see Figs. 4 to 7). As shown in Figs. 4 and 5, grooves 79 bear a certain definite relationship to slot 77, for reasons which will become apparent later.

Inscribed on a tapered skirt portion 80 of operating cap 66, between each adjacent pair of grooves 79, is a set of three letters, "S," "A," and "M," designated by reference characters 81, 82, and 83, respectively (see Fig. 5). The three letters "S" are equally spaced apart from each other and each one is 30 degrees from the groove 79 nearest to it. The three letters "A" also are equally spaced from each other and each one is 45 degrees from letter "S" adjacent thereto. The three letters "M" likewise are equally spaced from each other and each one is 30 degrees from its adjacent letter "A." These relationships are shown in Figs. 5 and 33 to 36, inclusive, and will be discussed more fully later.

Concentrically located on the inside surface 84 of the top of operating cap 66 is a stepped arcuate groove made up of a deep portion 85 and a shallower portion 86 (see Figs. 4, 5, 7, 8). The deep portion 85 begins in alignment with the longitudinal axis of slot 77 and proceeds in a clockwise direction, as viewed in Fig. 4, through an angle of 45 degrees. At the point where deep portion 85 terminates there is located a pin hole 87 which opens through the cap's upper end surface. At this terminal point, too, the shallower portion 86 begins and extends through an angle of 30 more degrees, thus making the total length of the stepped arcuate groove 75 degrees.

Detent and detent spring

Detent 67 is merely a cylindrical member of special length having a closed upper end and a blind recess 88 emanating from its lower end (see Fig. 18). The diameter of the cylinder is such that it is readily slidable in the stepped arcuate groove 85—86 in cap 66 (see Figs. 3 and 18). Detent spring 68 requires no comment now other than to say that it is a free fit in blind recess 88 of the detent 67. Further remarks about these two parts will be made later in discussing the assembly and operation of our device.

The drum cam

The next member to be introduced is the cylindrical or drum cam 69 (see Figs. 3 and 9 to 12). At equally spaced intervals on the periphery of this member are three substantially identical grooves 89 which extend from top to bottom (see Figs. 9, 12). One side 90 of the groove 89 is straight while the other side is made up of a short straight portion 91 and a longer straight portion 92 connected by a sloped portion 93, as shown in Fig. 12. Short straight portion 91, located in the lower part of drum cam 69, and the longer straight portion 92, located in the upper part, are both parallel to the single straight side 90 forming the opposite side of the groove.

In concentric relation to the periphery of the drum cam 69 is a hub 94 which is generated by the presence of a circular spring groove 95 which extends from the drum cam's lower surface a substantial distance inward toward its upper surface (see Figs. 9 to 11).

A slot 96 of substantially the same width and length as slot 77 of operating cap 66, is cut axially through the drum cam's upper surface and hub 94. This slot is so positioned as to be in direct alignment with that portion of one of the grooves 89 composed of short straight side 91 and single straight side 90 (see Fig. 9). Also aligned with slot 96, but located on the side of the drum cam diametrically opposite to the portion of the groove 89 just mentioned, and extending from the drum cam's upper surface a substantial distance toward its lower surface, is a blind cylindrical detent recess 97 (see Figs. 9 and 11). This recess is the same distance from the center of the drum cam as the stepped arcuate grooves 85—86 are from the center of the operating cap 66. The diameter of the detent recess 97 is sufficient slidably to accommodate detent 67, while the depth of the recess is substantially less than the detent's length. The reasons for this condition will become apparent later.

Firing pin and spring therefor

Referring to Fig. 3 the next member in our aggregation of components is the helical firing pin spring 70. It will be sufficient at this time to say that one end slidably fits into the circular spring groove 95 and around the hub 94 in drum cam 69, while the other end rests against a flange of the firing pin.

The next member of the first sub-assembly is the axially symmetrical firing pin 71 (see Figs. 13 to 17). This pin will there be seen to consist of a lower cylindrical shank 98 and an upper portion comprising parallel flats 99. The cylindrical shank is of substantially the same diameter as hub 94 in drum cam 69, but slightly less than the diameter of recess 73 in operating cap 66. The portion bearing parallel flats 99 is divided into a smaller head portion 100 at the uppermost extremity and a larger body portion 101 separated by a cylindrical neck 102 which is concentric with shank 98 and is the same diameter as the distance between the flats 99. The distance between the two flats 99 is slightly less than the width of slot 96 in the drum cam 69, and of slot 77 in operating cap 66.

At the lower end of shank 98 is a stepped flange consisting of a larger diametered portion 103 and a smaller diametered portion 104 which form at their juncture a shoulder 105. Spaced equidistantly around the periphery of the stepped flange, and extending between the flange's upper and lower surfaces, are six semi-circular recesses 106. A required relationship which exists between recesses 106 and flats 99, whose importance to the functioning of our novel device will later be made clear, can be seen in Fig. 13. This relationship is such that an imaginary line through the centers of one pair of the opposed recesses is perpendicular to the flats 99 and also, in consequence, an imaginary line through the shank 98 and midway between the parallel flats 99 bisects the distance between oppositely located pairs of recesses.

Projecting from the center of the stepped flange's lower surface is the detonating tip 107.

JIG FOR JOINING PARTS INTO FIRST SUB-ASSEMBLY

The components discussed thus far are members of the first sub-assembly of our invention. In order to assemble them we make use of the assembly jig 108 shown in Figs. 18 to 21 and 27 to 29, and a pin tool 109 shown in Figs. 20, 28 and 31.

The assembly jig 108 simply consists of a cylindrical portion 110 which issues from a cylindrical base 111. Projecting downward a substantial distance from the upper surface of cylindrical portion 110 toward the lower surface of the base 111 is an axial cylindrical recess 112. Press fitted into the accommodating holes therefor at the bottom of recess 112, at equal distances from its center, are two diametrically opposed pins 113 of slightly less diameter than the recesses 106 in the firing pin 71, and passing through the bottom of the recess at its center is a hole 114 (see Fig. 18).

There are several salient features of our assembly jig 108 and we shall call attention to the most important ones. The outside diameter of the cylindrical portion 110 is slightly less than the diameter of the recess 75 in operating cap 66. The diameter of the axial cylindrical recess 112 slidably accommodates drum cam 69, while the depth of recess 112 is such that with firing pin 71 properly located within the jig, and with the operating cap 66 manually pushed down until its inside surface 84 rests upon the upper surface of the cylindrical portion 110 of the assembly jig, the floor 76 of recess 73 in operating cap 66 rests slightly below the bottom of head portion 100 of firing pin 71 (see Figs. 18 to 21 and 27 to 29).

PROCEDURE FOR JOINING FIRST SUB-ASSEMBLY

In assembling the plug 65, operating cap 66, detent 67, detent spring 68, drum cam 69, firing pin spring 70, and firing pin 71 into the sub-assembly shown in Fig. 24, the following procedure has been found to be preferable. Since the plug 65 is merely pressed into the recess 72 in operating cap 66, this can be done at any convenient time before or after the assembly of the other parts.

Our first sub-assembly can be pictured as being made in four steps. In the first step (see Fig. 18), the assembly jig 108 is rested upon some firm surface and the firing pin 71 is placed in the recess 112 so that the detonating tip 107 projects into the jig's hole 114 and two oppositely located semi-circular recesses 105 in the stepped flange 103—104 are engaged by the jig's pins 113. Relative rotation between the firing pin 71 and assembly jig 108 is thus made impossible. This done, the jig 108 preferably is rotated until a flat 99 on firing pin 71 extends across the reader (from left to right) as shown in Fig. 18. Firing pin spring 70 is next placed around the firing pin 71.

Drum cam 69 is then prepared for inclusion in this sub-assembly as follows. Detent spring 68 is placed in the blind recess 88 in detent 67 and the detent is placed, open end down, into the detent recess 97 in the drum cam. The drum cam is then placed, with its hub 94 facing downward, upon the upper end of firing pin spring 70 and is rotated until slot 96 aligns with flats 99 on firing pin 71 and detent 67 is to the reader's right (see Figs. 18, 27 and 30). Next, operating cap 66 is held, open end down, at a slight distance above the drum cam 69 and the cap is rotated until cap slot 77 aligns with the previously aligned flats 99 of firing pin 71 and slot 96 of drum cam 69. It is additionally necessary at this point to have the stepped arcuate groove 85, 86 to the reader's right (see Figs. 18 and 27), so that when the cap 66 is lowered onto the drum cam 69, detent 67 will assume its appropriate position in the deeper portion 85 of the stepped arcuate groove.

In the second step of the sub-assembly (see Figs. 19 and 27), operating cap 66 is pressed down by hand as far as it will go so that its internal surface 84 rests upon the top surface of the cylindrical portion 110 of assembly jig 108. When this is done firing pin spring 70 is compressed, and the head portion 100 of firing pin 71 enters recess 73 in operating cap 66 (see Figs. 19 and 27); the cylindrical neck 102 of firing pin 71 enters slot 77 in operating cap 66 (see Figs. 19 and 22); and the flats 99 of firing pin 71 are slidably engaged by the slot 96 in the drum cam 69 (see Figs. 19 and 59). As a consequence of this step the assembly jig 108, firing pin 71 and drum cam 69 are secured against any relative rotation so that only the operating cap 66 will be able to be rotated in relation to the assembly jig.

Because of the earlier mentioned special length of detent 67 and because the depth of blind recess 97 in drum cam 69 is substantially less than the detent's length, these preceding steps of the first sub-assembly would be impossible unless the proper relationship existed between drum cam 69, detent 67 and operating cap 66. This condition, therefore, allows only the correct assembly of the components, and absolutely prevents any incorrect assembly because the axial distance from the bottom of recess 97 in drum cam 69 to the overlying shallower portion 86 of the arcuate groove in operating cap 66 is only slightly greater than the length of detent 67.

In the third step, still pressing the operating cap 66 down on the assembly jig 108, we rotate cap 66 forty-five degrees in a counterclockwise direction, as viewed from above, from the position of Fig. 27 to that of Fig. 28. This rotation of cap 66 causes its slot 77 now to extend somewhat across the under side of head portion 100 of firing pin 71 to create a latching effect between the two (see Fig. 20 and 28). Pressure on operating cap 66 may now be released because the firing pin spring is prevented by the said latching action from exerting the potential energy given it by the earlier compressive action. The rotation of operating cap 66 also causes the deeper portion 85 of the stepped arcuate groove to slide over detent 67 until the far end of portion 85 contacts detent 67 and thus prevents further rotation of the operating cap until later. At this time, too, the pin hole 87 in operating cap 66 assumes a position directly over the detent 67 as shown in Figs. 20, 28 and 31.

It will be noticed in Fig. 28 that the grooves 79 in operating cap 66 are not in radial alignment with the grooves in the drum cam formed by the one straight side 90 and the opposite short straight side 91. Before the sub-assembly can be useful the grooves 79 in cap 66 must align with the grooves 89 in the drum cam 69. In our fourth step, then, in order further to rotate the operating cap 66 for the purpose of aligning the grooves just mentioned, the pin tool 109 is inserted into pin hole 87 of operating cap 66 and the tool is pushed down as far as possible, overcoming the force of detent spring 68 and depressing the detent so that its upper end is just below the level of the shallower portion 86 of the arcuate groove in operating cap 66 (see Figs. 20 and 31). The limitation of rotative motion between drum cam 69 and operating cap 66 is thus released and, still depressing detent 67, operating cap 66 is rotated 30° more in a counterclockwise direction as viewed from above until the end of the shallower portion 86 of the stepped arcuate groove contacts the detent 67 (see Figs. 21, 29 and 32). This just mentioned rotation causes the slot 77 in operating cap 66 to turn at a greater angle across the under side of the head portion 100 of the firing pin 71, thereby enhancing the latching action between firing pin 71 and operating cap 66. The last mentioned rotation also causes the grooves 79 in operating cap 66 to come into alignment with grooves 89 in the drum cam 69 (see Fig. 29).

FEATURES OF FIRST SUB-ASSEMBLY

The sub-assembly of the operating cap 66, detent 67, detent spring 68, drum cam 69, firing pin spring 70, and firing pin 71 is now complete (see Fig. 24). What we essentially have is the under side of smaller head portion 100 of the firing pin 71 in latching engagement with the floor portion 76 at the bottom of recess 73, see Figs. 21 and 29; and the firing pin spring 70 compressed between the spring groove 95 of the drum cam 69 and the stepped flange 103—104 of the firing pin 71 (see Fig. 24).

It will be noted from Fig. 29 that the head portion 100 of the firing pin 71 and the slot 77 of the operating cap 66 are 75 degrees out of alignment. Another important relationship existing at this time can be seen from Fig. 51, namely the fact that if the center lines of grooves 79 in operating cap 66 are projected radially inward to the axis of the firing pin, as viewed from above, they will each bisect the central angle included between each of three pairs of adjacent semi-circular recesses 106 in the stepped flange 103—104 of firing pin 71. The utility of this relationship will later become clear.

As earlier stated, the total length of the stepped arcuate groove 85—86 in the operating cap 66 is also 75 degrees. Therefore, by turning the operating cap through 75 degrees in relation to the firing pin, the head portion 100 of firing pin 71 will be in alignment with slot 77 of operating cap 66, the latching action between the two will thus be broken and firing pin spring 70 will no longer be constrained. As a result the firing pin will be urged under spring pressure out of engagement with operating cap 66. This action, however, will be discussed more in detail when the operation of our invention is considered. For the present we shall continue by introducing other components of our device. According to the pattern mentioned earlier, it is appropriate now to discuss the second sub-assembly.

COMPONENTS OF SECOND SUB-ASSEMBLY

This sub-assembly consists of an inner sleeve 115, an outer sleeve 116, an intermediate water soluble chemical sleeve 117, and three spherical steel balls 118 (see Figs. 3 and 23).

The inner sleeve

The inner sleeve 115 has multiple staggered rows of closely spaced perforations 119 over substantially all its surface area. Near its lower edge are three equally spaced holes 120 each having a beveled perimeter 121. The inside diameter of inner sleeve 115 slidably accommodates the larger diametered portion 103 of the stepped flange on firing pin 71.

The outer sleeve

The outer sleeve 116, like the inner one, has multiple staggered rows of closely spaced perforations 122 over substantially all of its wall area. In addition, outer sleeve 116 has a flange 123 around its upper edge. Equidistantly spaced around the periphery of flange 123 are three U-shaped recesses 124 (see Figs. 3 and 25). The inside diameter of outer sleeve 116 is substantially greater than the outside diameter of inner sleeve 115 so that an appreciable space exists between the two sleeves when they are concentrically assembled.

The water-soluble chemical sleeve

The water soluble sleeve 117 may suitably be comprised of 40% lactose and 60% fused borax. Before being formed into the sub-assembly of inner sleeve 115, outer sleeve 116, and balls 118, the soluble sleeve components are in the form of a powder. However, by a procedure described below, the powder is compressed to form a firm and stable sleeve.

PROCEDURE FOR JOINING SECOND SUB-ASSEMBLY

In order to make the sub-assembly of the components just mentioned the inner sleeve 115 and outer sleeve 116 are concentrically positioned one within the other in an assembly jig (not shown) which allows the inner sleeve 115 to project a small distance below the lower edge of the outer sleeve 116. The distance, just mentioned, is such that the bottoms of balls 118, when resting on the beveled perimeter 121 of the holes 120, will be tangent to an imaginary plane extending across the bottom edge of sleeve 116. With the inner and outer sleeves so positioned balls 118 are introduced through holes 120 and are allowed to drop down the beveled perimeters 121. Because the balls have a diameter somewhat greater than the radial distance between the inside of outer sleeve 116 and the inside of inner sleeve 115, they are stopped by the inner wall surface of outer sleeve 116. When at rest in this fashion, each ball protrudes a short distance, which is slightly less than the difference between the diameters 103 and 104 of firing pin 71, radially inward past the inner wall surface of inner sleeve 115 (see Figs. 23 and 25).

At this point another important relationship must be established between the balls 118 and the U-shaped recesses 124 in the flange 123 of outer sleeve 116. This relationship is obtained by revolving the inner and outer sleeves in relation to each other, without disturbing their vertical relationship, until each of the three steel balls 118 is diametrically opposed to one of the U-shaped recesses 124 in the flange 123 of the outer sleeve 116 (see Fig. 25). The inside of inner sleeve 115 and the outside of outer sleeve 116 are then covered (by means not shown), leaving accessible only the space between the two sleeves. The powdered chemical is pelleted under great pressure into this space (by means not shown). The water soluble chemical sleeve 117 is thus formed, extending from the bottom of the outer sleeve 116 at one end to near the top of the inner sleeve 115 at the other end.

FEATURES OF SECOND SUB-ASSEMBLY

From Fig. 23 it can be seen that the water soluble chemical sleeve 117 fills all the perforations 119 in inner sleeve 115 and most of the perforations 122 in outer sleeve 116, thereby holding the two sleeves in the proper relationship with ample strength to withstand the force of the compressed firing pin spring 70, as will become evident later. The water soluble chemical sleeve 117 also is seen in Fig. 23 to be pressed around the balls 118 thereby preventing them from moving out of place.

OTHER INDIVIDUAL COMPONENTS

Referring to Fig. 3, the other individual components of our inventive device are a body 125, a primer 126, a primer holder 127, a penetrating pin 128, a gas cylinder 129, a ring gasket 130, and an end cap 131.

The body

From Figs. 3 and 24 the body is seen to consist of a comparatively long cylindrical portion 132, a flared top end 133, a lower threaded end 134, a side lug 135, and an internal partition 136.

The long cylindrical portion 132 has cylindrical cavities 137 and 138 above the partition 136 and a cylindrical cavity 139 below the partition (see Fig. 24). Cavity 137 is of sufficient diameter and length slidably to support the lower end of the outer sleeve 116 (see Fig. 24). Cavity 138 is somewhat larger in diameter than cavity 137, and is able to contain the outside diameter of outer sleeve 116. Cavity 139 below partition 136 slidably contains a cylinder 129 of compressed gas later to be described (see Fig. 24).

In the wall of long cylindrical portion 132, just below the flared top end 133, are two rows of staggered holes 140 (see Figs. 3 and 24). These holes open into recess 138. On the outside surface of the long cylindrical portion 132, also just below the flared top end 133 in the spaces between adjoining perforations 140, are inscribed three equally spaced arrows 141 (one of which is shown in Figs. 3 and 24) whose purpose will later be made clear.

The top flared end 133 of body 125 is of such outside diameter as slidably to accommodate recess 75 of operating cap 66 and has an axial recess 142 adjacent to and somewhat larger in diameter than cylindrical cavity 138 in the long cylindrical portion 132, the recess and cavity forming at their juncture a shoulder 143 (see Fig. 24). The diameter and depth of recess 142 are such as slidably to accommodate drum cam 69 and flange 123 on outer sleeve 116 (see Fig. 37). Equally spaced around the periphery of top flared end 133 and at the same distance from its top surface are three pins 144 which project a certain small distance into recess 142 at their inner ends and outwardly away from the lateral surface of the top flared end 133 at their outer ends (see Fig. 24). These pins 144, too, are in alignment with arrows 141 inscribed on the long cylindrical portion 132 of the body 125. As will later be described in more detail, the inner ends of pins 144 slidably engage the groove 89 in the drum cam 69 and the outer ends slidably engage the grooves 79 together with recess 74 in the operating cap 66 (see Fig. 37).

Projecting from shoulder 143 up into recess 142 is a small U-shaped lug 145. This lug is diametrically opposed to one of the three pins 144 and is of a size to slidably engage any one of the three U-shaped recesses 124 in flange 123 of outer sleeve 116 (see Fig. 25).

The lower threaded end 134 of the body 125 needs no other comment now other than to say that end cap 131 is later threadably attached thereto.

Located on the side of the long cylindrical portion 132, substantially midway between the top flared end 133 and the bottom threaded end 134, is a cylindrical side lug 135 (see Figs. 3, 24, and 26). At each end of the cylindrical lug is a shallow recess 146. Extending between the shallow recesses 146 is a hole 147 of somewhat lesser diameter than the shallow recesses 146 which forms shoulders 148 at its junction with recesses 146. Connecting hole 147 and cylindrical cavity 139 are two other holes 149, the axes of these holes being perpendicular to the axis of the body 125. These holes almost merge inside cavity 139 but diverge considerably in opening into hole 147. This angular divergence between the axes of the two holes is for a special purpose which will be explained later. Projecting from the wall of the hole 147 in side lug 135, and diametrically opposed to the holes 149, is a tongue 150 whose length is equal to the length of the hole 147 (see Figs. 3, 24 and 26).

As Fig. 35 shows, partition 136 of body 125 contains a threaded, tapered end recess 151 which funnels into a recess 152 of somewhat smaller diameter. Recess 152, in turn, joins with a hole 153 to form the shoulder 154.

The primer

Proceeding down the Fig. 3 array of components, the next member for discussion is the primer 126, having the closed percussion end 155. This member is a standard item of conventional design and need only be of proper external size to fit, under light pressure, partly into recess 152 in partition 136 and partly into a recess in the primer holder 127 now to be described (see Fig. 24).

The primer holder

The primer holder 127 is essentially cylindrical and has a lower threaded end 156 and an upper tapered nose 157 (see Fig. 35). Axially positioned through it from its top end are recesses 158, 159 and 160 (see Fig. 34). The lower threaded end 156 engages the threaded, tapered end recess 151 in partition 136 of body 125, while the tapered nose 157 engages the similarly tapered end of recess 151 in such a way as to form an effective gas seal between the primer holder 127 and the body 125. Recess 158, being the same size as recess 152 in partition 136, extends downward a short distance then joins the smaller diametered recess 159 to form at their juncture a shoulder 161 (see Fig. 34). At its lower end recess 159 joins with the somewhat larger diametered recess 160 forming at their juncture the shoulder 162. Recess 160 then continues to the lower surface of the primer holder. Extending across the face of lower threaded end 156 of the primer holder 127 into the recess 159 are four equally spaced grooves 163 which are so made as to extend a short distance into the shoulder 162 (see Figs. 34, 35 and 45).

The penetrating pin

The penetrating pin 128 has an upper cylindrical portion 164 and a lower triangular pyramid portion 165 (see Figs. 3, 24, 45 and 58). The cylindrical portion 164 slidably fits into recess 159 in primer holder 127, and the overall length of the penetrating pin 128 is slightly less than the distance between the shoulders 161 and 162 of the primer holder (see Fig. 34).

The gas cylinder

In order to supply gas for inflating the life saving device, we provide a small, thin, sealed metallic cylinder 129 which contains under pressure a sufficient quantity of a suitable gas such as $CO_2$ (not shown) for the purpose at hand (see Figs. 3 and 24). Cylinder 129 has an upper neck end 166, a cylindrical body portion 167 and a spherical end 168. Neck end 166 is slidably accommodated in recess 160 of the primer holder 127 (see Fig. 34) and the cylindrical body portion 167 is slidably accommodated in recess 139 in body 125 (see Fig. 24).

The ring gasket

Next to be considered is the rubber-like ring gasket 130 (see Figs. 3 and 24). It is sufficient now to say that the inside diameter of cylindrical cavity 139 in body 125 and the inside diameter of the gasket are substantially identical, while the gasket's outside diameter is somewhat larger than the diameter of the body's threaded end 134. As a result, when the gasket (which is accommodatingly mounted in the end cap 131) is placed into its assembled position, it acts as an effective gas seal for the jointure of the end cap to the body.

The end cap

The last component of our inventive device to be discussed is the end cap 131 which consists of the open cylindrical portion 169 and the hollow domed portion 170 (see Figs. 3 and 24). Cylindrical portion 169 contains the axially located threaded recess 171 for mating with the threaded end 134 of body 125, and a recess 172 for accommodating ring gasket 130. Below recess 172 is a floor portion 173. The inside shape of the hollowed dome portion 170 is substantially the same shape as the spherical end 168 of the gas cylinder 129.

PROCEDURE FOR FINAL ASSEMBLY OF ENTIRE DEVICE

All of the components of our device have now been presented and their characteristics have been identified. Therefore, the next portion of our disclosure will concern a preferred method for combining the components into the fully assembled device.

Positioning of penetrating pin in primer holder

With the primer holder 127 temporarily inverted from its Fig. 34 position, the penetrating pin 128 is placed, pyramidal end 165 pointing away from the primer holder's tapered end, into the holder's recess 159. In this position the flat end of the pin's cylindrical portion 164 is flush with the base of the holder's recess 158 which is to accommodate the primer.

Installation of primer and primer holder in body

Using light pressure, primer 126 is then placed, percussion end 155 outward, to the depth of shoulder 161 into the recess 158 of primer holder 127 (see Fig. 34). Thus positioned, the primer is in contact with the flat end of pin 128. Holding body 125 temporarily inverted from its Fig. 34 position, by use of a screw driver or like tool (not shown), the holder, which now contains the primer and penetrating pin, is next screwed into the threaded tapered end recess 151 in the body's partition 136 so that the portion of the primer which projects outside the primer holder will be snugly accommodated in the recess 152 in the partition (see Fig. 35). When the tapered nose 157 of the primer holder 127 is properly seated against the tapered end recess 151, an effective gas seal between the two parts is produced since the taper of recess 151 and the taper on nose 157 are so made as to include a very small fraction of an angle (not shown) between them, thus causing line contact with each other instead of the conventional area contact for sealing. In addition, primer 126 is closely confined between shoulder 154 in partition 136 of the body and shoulder 161 in recess 158 of the primer holder (see Fig. 34). Being a light press fit in the partition's recess 152 and in recess 158 in primer holder 127, the primer is able also to act as an effective gas seal to prevent the escape of gas, when later released from the cylinder 129, through the opening 153 in the partition 136 (see Figs. 24, 34, 35, 36A).

Placement of gas cylinder in body

With body 125 still inverted from its Fig. 34 position, the sealed cylinder 129 containing the gas under pressure (not shown) next is inserted, neck end 166 foremost, into the body's hollow threaded end 134. The closeness of fit between cylinder 129 and recess 139 of body 125 guides the neck end 166 of the cylinder into the recess 160 in primer holder 127. The insertion of the cylinder 129 continues until the cylinder's neck end 166 contacts the shoulder 162 between primer holder recesses 159 and 160. When properly seated within the body, the spherical end 168 of the cylinder projects a substantial distance beyond the face of the body's threaded end 134. The purpose for this condition will be evident later.

Securing of gasketed end cap to body

This done, ring gasket 130 is placed in the recess 172 in end cap 131, and the cap-containing gasket 130 is screwed onto the body's threaded end 134. The inside of the end cap's domed end 170 proximates the spherical end 168 of the cylinder 129. Upon continued turning of the cap relative to the body, the ring gasket 130 contacts the face of the body's threaded end 134 and is compressed between that face and the cap's floor 173, thus forming a seal between the cap and the body (see Fig. 24). Further turning causes the inside of the cap's domed end 170 to abut the spherical end 168 of the cylinder 129 and thus to securely confine it between the domed end 170 and the shoulder 162 in the primer holder 137. This completes the assembly of the components on the lower side of partition 136.

Installation of second sub-assembly in body

With the body 125 in the Fig. 3 position, the second sub-assembly, consisting of the inner sleeve 115, the outer sleeve 116, the water soluble chemical sleeve 117 and the balls 118, is placed flange 123 upward into the body's flared end 133. The body and the second sub-assembly are then rotated relative to each other until the three U recesses 124 in the flange 123 of the outer sleeve 116 pass by the three pins 144 which project a short distance into the body's flared end 133. Further relative rotation of the body and the second sub-assembly is applied until one of the three U-shaped recesses 124 aligns with the small lug 145 in the body's flared end 133. When this alignment is accomplished the second sub-assembly is further introduced axially into the body until the underside of flange 123 on the outer sleeve 116 rests upon the shoulder 143 in the body's flared end. This interfitting of the lug 145 with one of the U-shaped recesses 124 thus prevents any further relative rotation between the second sub-assembly and the body 125 (see Figs. 24 and 25). Note in Fig. 25 that the balls 118 in the inner sleeve 115 are in radial alignment with the pins 144 in the body's flared end 133.

Installation of first sub-assembly in body

In the last stage of the final assembly, with the body 125 in the Fig. 24 position, the first sub-assembly is axially aligned with the flared end 133 of the body 125. The first sub-assembly and the body, containing the previously assembled members, are then brought together so that the flanged end of the firing pin 71 is accommodated within the inner sleeve 115 of the second subassembly, and the recess 75 of the operating cap 66 slidably fits around the outside of the body's flared end. The body and the first sub-assembly are then rotated relatively until the three grooves 79 in the operating cap 66 are aligned with the three projecting pins 144 in the body's flared end. When so aligned, the outer ends of the projecting pins 144 will slidably fit into the operating cap's grooves 79 and their inner ends will slidably fit into the drum cam's grooves 89, making possible the further axial joining of the first sub-assembly and the body 125. These two units, therefore, are further pushed together until the rim of the body's flared end 133 contacts the inside surface 84 of the top of operating cap 66. No further sliding together of the first sub-assembly and the body 125 then is possible (see Figs. 33 and 37).

Beginning at this point, subsequent discussion of our invention will pertain to various relative positions between the operating cap 66 with its contained components, and the body 125 with the components contained therein. For convenience of explanation the relative positions of the operating cap mentioned immediately above will be called the "Assembly" position, the "Safe" position, the "Automatic" position and the "Manual" position. These positions of the operating cap 66 with its contained components, relative to the body 125 with its contained components, will now be discussed and the mode of operation of our device will become evident.

THE "ASSEMBLY" POSITION

In the above discussion of the assembly of our invention, we had proceeded to the point where we axially joined the operating cap 66 with its assembled parts to body 125 containing the properly positioned second sub-assembly and all the remaining components. This is the "Assembly" position earlier mentioned, and it will now be discussed with reference to Figs. 33, 35, 37, 41, 44, 46, 48, 50, 51 and 55.

With the operating cap 66 down fully on the body 125 a certain important relationship exists at this point between the semi-circular recesses 106 of firing pin 71 and the balls 118 in the inner sleeve 115 of the second sub-assembly, as shown in the side views, Figs. 35, 48 and 50, and in the top view Fig. 55. In Figs. 35, 48 and 50 it can be seen that the shoulder 105 in the stepped flange 103, 104 of the firing pin 71 comes into light contact with the balls 118 (one of which is shown) in the inner sleeve 115 of second sub-assembly. As a consequence, the periphery of the small diametered step 104 of flange 103, 104 lightly contacts the balls 118 (one of which is shown) to thus prevent their falling radially inward from their position in the inner sleeve 115 both before and during operation of our device. From the Fig. 55 relationship it can be seen that the balls 118 in the inner sleeve 115 are not in alignment with recesses 106 in the stepped flange 103, 104 of the firing pin 71. Thus, the path of firing pin 71 is blocked at this time because of two independent conditions: the latching action between firing pin 71 and cap 66, and because of the misalignment between the balls 118 and the recesses 106.

Figure 46:
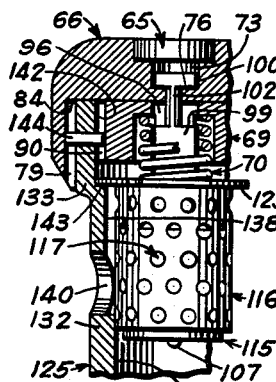
Figure 47:
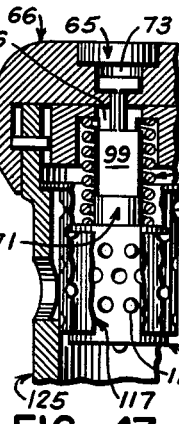

Other important conditions also exist at this time, namely: the relationship between the shoulder 78 in operating cap 66 and the outer ends of pins 144 in the body's flared end 133 as shown in Figs. 33 and 46; the relationship between the grooves 89 of drum cam 69 and the inner ends of pins 144 as shown in Fig. 44; and the relationship between detent 67 and the stepped arcuate groove 85—86 in the operating cap 66 as shown in Figs. 37 and 41.

As seen in Figs. 33 and 46, when the first sub-assembly has been axially inserted the maximum possible distance within body 125, the shoulder 78 in the operating cap 66 is substantially in the same plane as the lowest point of the diameter of pins 144. Therefore, as soon as the cap 66 is rotated clockwise, as viewed from above, the shoulder 78 in the operating cap 66 will pass under the outer end of pins 144, thus making removal of the operating cap 66 from the body 125 impossible.

Concerning the clockwise direction of rotation which we just mentioned: a consideration of previous details concerning the operating cap 66, the detent 67 and the drum cam 69, will make it readily apparent that at this stage it is impossible to rotate the operating cap 66 in a counterclockwise direction, as viewed from above. This condition exists by virtue of the position of the detent 67 in relation to the stepped arcuate groove 85—86 (see Fig. 37), and also by virtue of the position of the inner ends of pins 144 in relation to the single straight side 90 of grooves 89 (see Figs. 37, 41 and 44).

At this time, too, the inner ends of the pins 144 have passed along the short straight portion 91 of the groove 89 in the drum cam 69 and have reached a point just near the beginning of the sloped portion 93 of the grooves 89 (one of which is shown in Fig. 44).

The relationship between detent 67 and the stepped arcuate groove 85—86 in the operating cap 66 is clearly established in Figs. 37 and 41. Here it can be seen that the outside end of detent 67 rests in the shallow portion 86 of the stepped arcuate groove 85, 86.

THE "SAFE" POSITION

Having axially joined the first sub-assembly and the body 125 to the maximum possible limit of their engagement, as previously mentioned, the operating cap 66 is rotated in a clockwise direction, as viewed from above, through an angle of 30 degrees relative to the body. The operating cap 66, in other words, is rotated from the position shown in Figs. 33 and 37 to the position shown in Figs. 34 and 38. The new position of the operating cap 66 is the "Safe" position and will be discussed with reference to Figs. 34, 38, 42, 44, 47, 48 and 52.

In the "Safe" position of the operating cap 66, the letters "S" (also identified by reference character 81) inscribed on the skirt 80 of the operating cap 66 are in registry with the arrows 141 inscribed on the long cylindrical portion 132 of the body 125. See Fig. 34.

In turning the operating cap clockwise from the "Assembly" position of Figs. 33, 37 and 41 to the "Safe" position of Figs. 34, 38 and 42, the drum cam 69 has remained stationary, being prevented from rotation along with the operating cap 66 by virtue of the relationship (shown in Fig. 44) between the inner ends of pins 144 and the sloped portions 93 of the grooves 89, and further because of the relationship (shown in Figs. 38 and 42) between the detent 67 and the stepped arcuate groove 85—86.

Because the firing pin 71 is engaged to the drum cam 69 by virtue of the Fig. 59 association, the firing pin likewise has remained stationary since it can only rotate when the drum cam is rotated, and the Fig. 55 relationship between the balls 118 and the semi-circular recesses 106 in the stepped flange 103, 104 still remains: that is, the balls 118 and the semi-circular recesses 106 are not in alignment. However, the relative rotation between the body 125 and the first subassembly has resulted in relative rotation between the operating cap 66 and the firing pin 71. This is due to the fact that the slot 77 in operating cap 66 has moved thirty of the necessary seventy-five degrees toward alignment with the head portion 100 of the firing pin 71 (compare Figs. 37 and 38).

While in the "Safe" position, as well as in the "Automatic" and "Manual" positions later to be discussed, operating cap 66 cannot be removed from body 125 because the outer ends of pins 144 rest upon the shoulder 78 in the operating cap 66 (see Figs. 34, 38, 47 and 52).

In addition, the operating cap 66 cannot be turned backward to the previous "Assembly" position without the aid of a pin tool. This is so because the inner ends of pins 144 abut the single straight side 90 of grooves 89, and because the detent 67 has been sprung by spring 68 from the shallow portion 86 to the deep portion 85 of the stepped arcuate groove in the operating cap 66 (see Figs. 38, 42).

From the operating standpoint, our device will not function when the operating cap 66 is in the "Safe" position. As mentioned previously, operation is impossible because of two independent conditions: the latching action between firing pin 71 and operating cap 66 (see Fig. 47), and because the balls 118 are not in alignment with the semi-circular recesses 106 in the stepped flange 103, 104 of the firing pin 71 (see Figs. 48 and 55).

THE "AUTOMATIC" POSITION

Further clockwise rotation of the operating cap 66, as viewed from above, from the "Safe" position of Figs. 34 and 38 to that of Figs. 35 and 39 will produce the "Automatic" position of the operating cap 66. The "Automatic" position will be discussed with reference to Figs. 35, 39, 43, 48, 50 and 55.

For the same reasons mentioned in discussing the "Safe" position, the drum cam 69 and the firing pin 71 remain stationary as the cap 66 is rotated. As the cap 66 is rotated from the "Safe" to the "Automatic" position the deeper portion 85 of the stepped arcuate groove in the operating cap passes over the detent 67, until, at the "Automatic" position, the detent is at the opposite end of the deeper groove portion 85 from what it was in the "Safe" position (compare Figs. 38 and 42 to 39 and 43).

In the "Automatic" position the letters "A" (identified by reference character 82) inscribed on the skirt 80 of operating cap 66 are in alignment with the arrows 141 inscribed on the cylindrical portion 132 of the body 125 (see Fig. 35).

In the "Automatic" position, too, the slot 77 in the operating cap 66 is in direct alignment with the head 100 of the firing pin 71, and thus the latching action between operating cap 66 and firing pin 71 is released (see Figs. 39 and 48). However, the axial travel of the firing pin 71 is still restrained by the balls 118 which project a short distance into the inside of the inner sleeve 115 (see Figs. 48, 50 and 55). In other words, the resilient force of the compressed firing pin spring 70 is prevented from acting now only by the balls 118 contained in the inner sleeve 115, these balls being held to the securely located outer sleeve 116 by means of the water soluble chemical sleeve 117.

Should enough water reach the soluble chemical sleeve 117, the bond between inner sleeve 115 and outer sleeve 116 would be broken and our device would "automatically" operate, as will be explained later.

If, prior to use wherein the water soluble sleeve is dissolved, it should become necessary or desirous to return to the "Safe" position, this may be readily accomplished merely by rotating the operating cap counterclockwise, as viewed from above, from the position shown in Figs. 35 and 39 to that shown by Figs. 34 and 38.

THE "MANUAL" POSITION

Rotating the operating cap 66 clockwise thirty degrees, as viewed from above, from the position of Figs. 35, 39, 43 and 53 to the position of Figs. 36, 36A, 40 and 54 will cause the letters "M" (identified by reference character 83) inscribed on the skirt 80 of the operating cap 66 to align with the arrows 141 inscribed on the body 125. This position of the operating cap is known as the "Manual" position and is used if it should become desirable to operate our device without having to depend upon the solution of the soluble chemical sleeve 117.

Since, in the "Automatic" position, the deeper portion 85 of the arcuate groove 85—86 had traversed its rotative limit over the detent 67, any further clockwise rotation of the operating cap 66 past the "Automatic" position would also cause the drum cam 69 to turn in unison because those parts would be coupled by the detent 67. As the drum cam 69 is rotated, the sloped portions 93 of the grooves 89 are turned into the inner ends of pins 144 causing the drum cam 69 to move away from the underside 84 of the top of the operating cap 66, thus further compressing the firing pin spring 68. This results in presentation of resistance to rotation to the "Manual" position (see Fig. 57), which is desirable as it prevents accidental turning of the cap past the normally desired "Automatic" position.

Because the parallel flats 99 of the firing pin 71 slidably fit into slot 96 in the drum cam 69 (see Fig. 59), thus causing the firing pin 71 and drum cam 69 to rotate together as the operating cap 66 is rotated, the firing pin is likewise rotated. This causes the semi-circular recesses 106 in the firing pin's stepped flange 103, 104 to approach alignment with the balls 118 in the inner sleeve 115 (compare Figs. 55 and 56).

Figure 49:
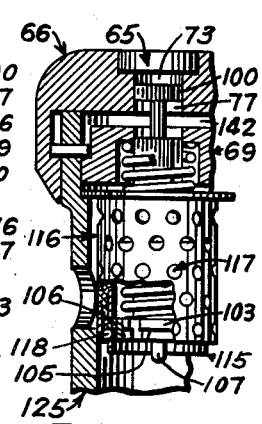

The semi-circular recesses 106 in the firing pin 71 become aligned with the balls 118 in inner sleeve 115 when the letters "M" in the operating cap align with the arrows 141 inscribed on the body 125 (see Figs. 36, 49 and 56). At that time the axial travel of the firing pin is no longer obstructed and the resilient energy of the compressed firing pin spring 70 is released, causing the firing pin to spring forcefully toward the percussion end 155 of the primer 126 (see Fig. 36A).

The sloped portions 93 of the drum cam grooves 89 serve a twofold purpose: first they add resistance to the turning of the operating cap 66 from the "Automatic" to the "Manual" position in order that our device cannot inadvertently be operated manually; second, they cause the operating cap 66 to return back to the "Automatic" position should the person using our device begin turning the operating device to the "Manual" position and then, through personal injury or some other cause, not be able to turn the operating cap all the way to the "Manual" position.

THE LIFE VEST

The conventional inflatable life vest to which our invention is illustratively attached consists of two somewhat U-shaped independent cells 174 of rubber, or some similar material (see Fig. 1). The cells are contained in a similarly shaped fabric bag (not shown) to which are secured the leg straps 175 and the waist belt 176.

The leg straps 175 are secured at one end to the top of the life vest by means of the ring 177 which encircles the two cells 174. At their opposite ends the leg straps are attachable to the buckles 178 which are secured to the waist belt 176. The waist belt, in well known fashion, also contains a buckle (not shown) to facilitate application and removal of the life vest by the wearer.

In order to don the life vest, leg straps 175 and waist strap 176 being unbuckled, the wearer puts his head (not shown) through the opening 179 so that the cells 174 extend around the back of his neck, forward over the shoulders, then down the front of his body. The leg straps 175 hang in back from the ring 177. When the life vest is thus positioned, the waist belt is joined at the buckle (not shown), and the leg straps 175 are drawn forward under the wearer's crotch and upward to the buckles 178 to which they are then securely joined in well known fashion (see Fig. 1).

As shown in Fig. 2 there is integrally connected to the lower part of each cell 174 a valve stem 180 having a shoulder 181 adjacent the cell and an axial opening 182 containing a valve (not shown). At its outer end valve stem 180 carries the thread 183. In the wall on the outside of valve stem 180, located in such a manner as to vertically position our attached invention, is an axial groove 184. Through the wall near the outer end of the valve stem 180, and diametrically opposed to the axial groove 184, is an opening 185 of somewhat larger diameter than the holes 149 in the side lug 135 of our device's body 125. Axial opening 182 communicates through a valve of conventional design to the inside 186 of the cell 174.

ATTACHMENT OF OUR DEVICE TO LIFE VEST

In order to position our device on the life vest, a small ring gasket 187 is placed in the shallow recesses 146 at each end of the side lug 135 of the body 125. The valve stem 180 and its groove 184 are aligned with the opening 147 and tongue 150, respectively, in the side lug 135. The valve stem 180 and the side lug 135 are then pushed together until a small ring gasket 187 abuts the shoulder 181 on the valve stem 180. In this position it can be seen that one of the two holes 149 is in alignment with the opening 185 in the wall of the valve stem 180. Cap 188 is then threadably attached to the valve stem 180 until the ring gaskets 187 are firmly compressed between the shoulder and the cap 188.

OPERATION OF OUR DEVICE

In discussing the operation of our device let it be assumed that it is attached to an inflatable life vest and that the life vest has been strapped to a person's body (see Figs. 1 and 2).

When there is no immediate necessity to use our device, the operating device may be placed either in the "Safe" or the "Automatic" positions at the discretion of the person concerned.

Should it become necessary to use our device, results can be accomplished in either one of two ways, by automatic or manual operation.

For automatic operation, the operating cap 66 is turned by the wearer until the three equally spaced letters "A" on the cap are in alignment with the equally spaced arrows 141 on the body 125 (see Fig. 35). Then, if the wearer should fall into a body of water, as soon as the water reaches our inventive device it will pass through the holes 149 in body 125 and contact the water soluble chemical sleeve 117. The chemical will be quickly dissolved, releasing the bond between the inner sleeve 115 and the outer sleeve 116.

Immediately, since the compressed firing pin spring 70 constantly exerts its energy against the balls 118 in the inner sleeve 115, the balls will be pushed down as there no longer will remain any restraining means therefor. In turn, the balls will push the inner sleeve 115 axially downward away from the stationary outer sleeve 116 (see Figs. 50 and 50A). When this separation of the sleeves has continued a sufficient distance, the balls 118, which are pushed by the shoulder 105 of firing pin 71 with the aid of the beveled perimeters 121 of holes 120 in the inner sleeve 115, move radially outward toward the wall of recess 137 of the body 125 (see Fig. 50A).

When the balls 118 are fully out, the inside of the inner sleeve 115 is no longer obstructed, and the firing pin 71, under energy supplied by the firing pin spring 70, rushes rapidly toward the primer 126. Detonating tip 107 of firing pin 71 strikes the percussion end 155 of primer 126 with sufficient force to fire the primer. The force generated by the detonation of the primer 126 acts on the flat face of the cylindrical end 164 of the penetrating pin 128, swiftly forcing that pin toward the neck end 166 of the gas cylinder 129 with sufficient energy to cause the pin's triangular-pyramidal end 165 to puncture the face of the gas cylinder's neck end 166.

The cylinder's gas, under pressure, is immediately released, blowing the penetrating pin 128 out of the puncture hole (not shown) back into the position it formerly occupied. Gas from cylinder 129 then rushes through the grooves 163 in the primer holder 127 and into the cylinder recess 139 in the body 125. As the pressure builds up in the recess 139, the gas flows through holes 149 into the axial opening 182 in the valve stem 180. Pressure in the axial opening increases and the valve (not shown) in the stem 180 is thereby depressed, allowing gas to flow directly to the inside 186 of the cell 174 until the cell becomes inflated to the proper extent (not shown).

If the person using our device desires to operate it manually, he merely turns the operating cap 66 until the letters "M" on the operating cap 66 align with the arrows 141 on the body 125. As previously mentioned, this action causes the semi-circular recesses 106 in the stepped flange 103—104 of the firing pin 71 to align with the balls 118 in inner sleeve 115 so that the firing pin 71 is no longer restrained by the balls. The firing pin 71 then springs toward the primer 126 and detonates it. Subsequent operation from that point on is the same as was mentioned above in connection with the automatic operation.

From the foregoing it will be apparent that we have provided a light, small, compact, simply constructed yet highly effective means for inflating such life saving devices as rubber suits, vests, rafts, boats, and the like; that we have provided a means for inflating life saving devices, which means is prevented from accidental disassembly or operation; that we have provided a means for inflating life saving devices, which means is operable either automatically upon contact with water or other liquid; that we have provided a means for inflating life saving devices, which means is insensible to mechanical shock and to changes in barometric pressure; that we have provided a means for inflating life saving devices, which means is capable of being set at will in an inoperative or "safe" position until the user desires to make it operative either automatically or mechanically.

Since our invention has been disclosed in but one preferred form and, for illustrative purposes only, in connection with its performance when used on an inflatable life vest, we do not wish to be confined to the narrow limits here involved, because many variations and adaptations of our novel device are possible without departing from the original spirit and scope of our invention.

We claim:

1. In a device for use in expanding an inflatable member, the combination of a hollow cylindrical body, a partition dividing the body's interior into upper and lower chambers, a puncturable cartridge containing a fluid under pressure housed in said body's lower chamber, a base cap secured to the opening into the body's lower chamber and removable to allow for insertion of said cartridge, a holder removably secured to said partition, means for puncturing said cartridge loosely fitted in said holder with a sharp end facing the cartridge, an explosive primer carried by said holder adjacent said puncturing means, a water-soluble sleeve housed in said body's upper chamber, a plurality of support member spacedly projecting radially into the sleeve's central opening, a firing pin consisting of an upper longitudinal shank and a lower transverse flange portion which has in its periphery notches whose number and spacing coincide with but whose size is larger than said radially projecting support members, a helical spring encircling said firing pin's shank and supported by the flange thereof, a drum cam having a slot for accommodating the free end of said firing pin's shank, and, removably fitted over the entrance to said body's upper chamber, an operating cap to which said firing pin, spring and drum cam are removably secured in a unitary manner.

2. In a device for use in expanding an inflatable member, the combination of a hollow cylindrical body, a partition having an opening therethrough dividing the body's interior into upper and lower communicating chambers, a puncturable cartridge containing a fluid under pressure housed in said body's lower chamber, a base cap secured to the opening into the lower chamber and removable to allow for insertion of said cartridge, means for puncturing said cartridge mounted in said partition for axial movement with a sharp end facing the cartridge, an explosive primer mounted in said partition adjacent said puncturing means, a water-soluble sleeve housed in said body's upper chamber, at least one support member projecting into the sleeve's central opening, a firing pin consisting of an upper vertical shank and a lower horizontal flange portion both mounted for unitary axial movement within said sleeve's central opening, a helical spring encircling said firing pin's shank and supported by the flange thereof, a drum cam having a slot for accommodating the free end of said firing pin's shank, and, removably fitted over the entrance to said body's upper chamber, an operating cap to which said firing pin, spring and drum cam are removably secured in a unitary manner.

3. In a device for use in expanding an inflatable member, the combination of a hollow cylindrical body, a puncturable cartridge containing fluid under pressure housed in said body, a base cap secured to one end of said body and removable to allow for insertion of said cartridge, means for puncturing said cartridge mounted for axial movement within said body with a sharp end facing the cartridge, an explosive primer mounted adjacent said puncturing means, a water-soluble sleeve housed in said body spaced from said primer, at least one support member projecting into the sleeve's central opening, a firing pin consisting of an upper vertical shank and a lower horizontal flange portion both mounted for unitary axial movement within said sleeve's central opening, a helical spring encircling said firing pin's shank and supported by the flange thereof, a drum cam having a slot for accommodating the free end of said firing pin's shank, and removably fitted over the entrance to the end of said body opposite the base cap, an operating cap to which said firing pin, spring and drum cam are removably secured in a unitary manner.

4. In a device for use in expanding an inflatable member, the combination of a hollow cylindrical body, a puncturable cartridge containing fluid under pressure housed in said body, a base cap secured to one end of said body and removable to allow for insertion of said cartridge, means for puncturing said cartridge mounted for axial movement within said body with a sharp end facing the cartridge, an explosive primer mounted adjacent said puncturing means, a water-soluble sleeve housed in said body spaced from said primer, at least one support member carried by the sleeve and projecting into its central opening, a firing pin consisting of an upper vertical shank and a lower horizontal flange portion both resiliently mounted within said sleeve's central opening for unitary axial movement toward said primer, a drum cam having a slot for accommodating the free end of said firing pin's shank, and, removably fitted over the entrance to the end of said body opposite said base cap, an operating cap to which said firing pin and drum cam are removably secured in a unitary manner.

5. In the device of claim 4, a support for the water-soluble sleeve comprising, a water-insoluble outer sleeve having a flange for resting on an accommodating portion of the body's interior, and a water-insoluble inner sleeve, all three of said sleeves being concentric with the water-soluble sleeve in intermediate position and all being fixed together in a unitary manner until such time as that fixed relationship is disrupted by water contacting and dissolving the intermediate sleeve.

6. In a device of the class described; a hollow cylindrical body having an opening at one end; a plurality of pins mounted in the wall of said body near its open end and projecting from both sides of said body wall; a circular operating cap having a lid portion and a dependent circumferential rim portion, the lid portion having on its inner surface a T-shaped recess extending thereinto, and the rim portion having on its inner surface a circumferential shoulder adapted supportingly to receive the ends of said pins projecting from the outside of said body's wall whereby to attach the cap to the body; a drum cam having a centrally located slot extending axially therethrough, and the cam's peripheral surface having a plurality of Z-shaped grooves adapted to ride against the ends of said pins projecting from the inside of said body's wall whereby to urge the cam away from its contact with the cap; a substantially T-shaped firing pin whose cross-head portion is adapted to fit through the slot in said drum cam and into selective locking relationship with the T-shaped recess of said cap; and a spring normally in compressed relationship between said firing pin and said drum cam so that upon rotating the cap to a position where the firing pin's cross-head portion is unlocked with respect to the cap's T-shaped recess the spring forces the firing pin sharply to plunge free of the cap and cam.

7. In the device of claim 6; the circular operating cap having on the inner surface of its lid portion a stepped arcuate groove through which a pin hole extends to the cap's outer surface; the drum cam having a blind recess whose opening faces the inner surface of said cap; and a detent resiliently mounted so as to protrude from said cam's blind recess into articulation with said cap's stepped arcuate groove upon placement of the cam in contact with the inner surface of said cap's lid portion, this articulation serving to keep the pins on the body in locking engagement with the cap's circumferential shoulder by preventing rotation of the cap relative to the body any distance greater than the length of the arcuate groove unless the detent is previously contacted through the cap's pin hole and depressed out of engagement with the arcuate groove.

8. In a device for actuating a fluid responsive member, a hollow holder, and housed within the holder a puncturable cartridge containing a fluid under pressure for actuating said member, means for puncturing said cartridge, a chemical explosive-operated means for supplying the force necessary to activate said puncturing means, means for detonating said chemical explosive-operated means, means including a fluid-destructible barrier for normally restraining actuation of said puncturing means, and means whereby the device may selectively be pre-set by the user to a "safety" position which makes the device inoperative, or to an "automatic" position which makes the device operative when a fluid contacts and destroys the barrier, or to a "mechanical" position which instantly frees the puncturing means and enables it forthwith to puncture said cartridge.

9. In a device for actuating a fluid responsive member, a hollow holder, and housed within the holder a puncturable cartridge containing a fluid under pressure for actuating said member, means for puncturing said cartridge, an explosive force developing means for furnishing the blow required to actuate said puncturing means, a resiliently loaded firing pin for detonating said force developing means, means including a fluid-destructible barrier for normally restraining actuation of said firing pin until fluid contacts and destroys the barrier, and means whereby the device may selectively be pre-set by the user to a "safety" position which makes the device inoperative, or to an "automatic" position which makes the device operative when a fluid contacts and destroys the barrier, or to a "mechanical" position which instantly frees the firing pin and enables it forthwith to detonate the explosive force developing means.

10. In a device for actuating a fluid responsive member, a holder, and housed within the holder a puncturable cartridge containing a fluid under pressure for actuating said member, means for puncturing said cartridge, a force developing means consisting of an explosive substance for furnishing the blow required to actuate said puncturing means, a resiliently loaded firing pin for detonating said explosive force developing means, and means including a fluid-destructible chemical barrier for normally preventing said firing pin from acting on said force developing means until the barrier is destroyed upon being placed in contact with a destructible fluid.

CLARENCE WALTON MUSSER.
ALBERT BENDITT.

REFERENCES CITED

The following references are of record in the file of this patent:

UNITED STATES PATENTS

| Number | Name | Date |
|---|---|---|
| 701,329 | Graham | June 3, 1902 |
| 1,329,990 | Muller | Feb. 3, 1920 |
| 2,203,626 | Grant | June 4, 1940 |

FOREIGN PATENTS

| Number | Country | Date |
|---|---|---|
| 151,254 | Great Britain | Oct. 7, 1920 |